(12) United States Patent
Fujita et al.

(10) Patent No.: US 12,548,213 B2
(45) Date of Patent: Feb. 10, 2026

(54) IMAGE INSPECTION SYSTEM

(71) Applicant: Keyence Corporation, Osaka (JP)

(72) Inventors: Hiroyuki Fujita, Osaka (JP); Yosuke Shiota, Osaka (JP); Yamato Uehara, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 114 days.

(21) Appl. No.: 18/589,500

(22) Filed: Feb. 28, 2024

(65) Prior Publication Data
US 2024/0331232 A1    Oct. 3, 2024

(30) Foreign Application Priority Data

Mar. 31, 2023  (JP) .................. 2023-058214

(51) Int. Cl.
*G06T 11/20*    (2006.01)
*G06T 7/00*    (2017.01)

(52) U.S. Cl.
CPC .......... *G06T 11/206* (2013.01); *G06T 7/0004* (2013.01); *G06T 2207/30164* (2013.01); *G06T 2210/52* (2013.01)

(58) Field of Classification Search
CPC ............... G06T 11/206; G06T 7/0004; G06T 2207/30164; G06T 2210/52
See application file for complete search history.

(56) References Cited

U.S. PATENT DOCUMENTS

| 7,107,519 | B1 | 9/2006 | Webster et al. | |
| 2001/0037694 | A1* | 11/2001 | Freifeld | G01N 21/952 |
| | | | | 600/407 |
| 2014/0181752 | A1* | 6/2014 | Kim | G06F 3/04817 |
| | | | | 715/835 |
| 2015/0022637 | A1* | 1/2015 | Saeki | G06T 7/0004 |
| | | | | 348/46 |
| 2020/0364906 | A1* | 11/2020 | Shimodaira | G06V 10/82 |
| 2023/0418452 | A1 | 12/2023 | Uchiyama et al. | |

FOREIGN PATENT DOCUMENTS

JP    2000209566 A  *  7/2000

OTHER PUBLICATIONS

Habraken, Joe, "Office 2010 in Depth", Que Publishing, 2011, p. 381-408. (Year: 2011).*
U.S. Appl. No. 18/589,503, filed Feb. 28, 2024 (46 pages).

* cited by examiner

*Primary Examiner* — Michelle L Sams
(74) *Attorney, Agent, or Firm* — Kilyk & Bowersox, P.L.L.C.

(57) ABSTRACT

To speed up an entire inspection by preventing display processing from delaying execution of inspection processing. An image inspection system includes an imaging unit, a first control unit configured to generate a setting screen on which a formula setting of an imaging parameter of the imaging unit, a formula setting of an inspection parameter of a workpiece image, and a display setting of an inspection result can be set in a cell of a worksheet, and display the inspection result on a display unit according to the display setting set in the cell of the worksheet, and a second control unit configured to cause the imaging unit to execute imaging processing, execute inspection processing on the workpiece image, and execute a formula calculation related to the imaging parameter and the inspection parameter set in the worksheet.

13 Claims, 11 Drawing Sheets

IMAGE INSPECTION SYSTEM

CROSS-REFERENCE TO RELATED APPLICATIONS

The present application claims foreign priority based on Japanese Patent Application No. 2023-058214, filed Mar. 31, 2023, the contents of which are incorporated herein by reference.

BACKGROUND OF THE INVENTION

Field of the Invention

The present invention relates to an image inspection system that performs an inspection based on a workpiece image.

Description of Related Art

For example, specification of U.S. Pat. No. 7,107,519B discloses a user interface using a spreadsheet. In the user interface disclosed in the specification of U.S. Pat. No. 7,107,519B, contents of image processing, a parameter of each image processing, a numerical calculation of an output result, and the like are expressed by cells.

Since both the execution of the image processing and the numerical calculation are integrally inseparable, the numerical calculation is also executed by software incorporated in an image processing device.

SUMMARY OF THE INVENTION

However, in the user interface using the spreadsheet disclosed in the specification of U.S. Pat. No. 7,107,519B, there is a numerical calculation of a parameter or an output result displayed in a cell that is not referred to during execution of inspection processing and is merely displayed, and such display processing may cause a delay in the execution of the inspection processing.

The present invention has been made in view of the above problems, and an object of the present invention is to speed up an entire inspection by preventing display processing from delaying execution of inspection processing.

In order to achieve the above object, according to one aspect of the present invention, an image inspection system that performs an inspection based on a workpiece image obtained by imaging a workpiece can be assumed. The image inspection system includes: an imaging unit configured to form a workpiece image by imaging a workpiece; a first control unit configured to generate a setting screen on which a formula setting of an imaging parameter of the imaging unit, a formula setting of an inspection parameter of the workpiece image, and a display setting of an inspection result are set in a cell of a worksheet, and display the inspection result on a display unit according to the display setting set in the cell of the worksheet; and a second control unit configured to cause the imaging unit to execute imaging processing, execute inspection processing on the workpiece image, and execute a formula calculation related to the imaging parameter and the inspection parameter set in the worksheet.

According to this configuration, since the formula setting of the imaging parameter, the formula setting of the inspection parameter, and the display setting of the inspection result can be set in the cell of the worksheet, a user can easily grasp a relationship among the settings when the user sets a desired setting. At the time of operation, the first control unit executes display processing of displaying the inspection result on the display unit. On the other hand, the imaging processing, the inspection processing on the workpiece image, and the formula calculation related to the imaging parameter and the inspection parameter are executed by the second control unit different from the first control unit. Since control units are separated in this manner and the inspection processing and the display processing are executed by different control units, the inspection processing is not delayed due to execution of the display processing.

The first control unit may be operated in a client device, and the second control unit may be operated in an image processing controller connected to the client device. The second control unit may analyze the imaging processing, the inspection processing, and a reference relationship among cells of the worksheet, and may automatically specify a formula calculation based on an analysis result. Since a cell to be executed by the second control unit can be automatically specified by analyzing the reference relationship, a user does not need to specify the cell.

The imaging parameter may include at least one of an exposure time, a focus position, a zoom magnification, an HDR setting, and a gain. The inspection parameter may include information for specifying a position on an image coordinate system to which an inspection tool is applied.

In addition, the inspection parameter may include a search region and a search parameter of a positioning tool that searches for a region to be inspected. The inspection parameter may include information related to cooperation of a plurality of inspection tools. The inspection parameter may include an inspection parameter of a second inspection tool that executes processing based on an inspection result of a first inspection tool.

The display setting may include at least one of a display of a non-defective product and a defective product acquired by the inspection processing, a graph display of the number of non-defective products and the number of defective products acquired by the inspection processing, and a display of a workpiece image subjected to the inspection processing. The first control unit may cause the display unit to display a graph using the inspection result according to the display setting set in the cell of the worksheet. That is, since the first control unit executes high-load processing such as generating a graph using the inspection result, it is possible to avoid a delay in the inspection processing.

The second control unit may include an imaging calculation unit and an inspection calculation unit. In this case, the formula calculation of the imaging parameter by the imaging calculation unit and the formula calculation of the inspection parameter by the inspection calculation unit can be executed in parallel, and for example, a calculation of an inspection parameter used in an inspection of an acquired workpiece image and a calculation of an imaging parameter to be used in subsequent imaging can be executed in parallel. As a result, a processing speed is increased.

When the inspection processing involves a first inspection tool and a second inspection tool that executes processing after the first inspection tool, after execution of processing by the first inspection tool is completed, the second control unit can transmit a completion notification of the first inspection tool and a first inspection result of the first inspection tool to the first control unit, and can start a formula calculation of an inspection parameter of the second inspection tool. The first control unit can start execution of display processing using the first inspection result according to the display setting, and the display processing executed by the first control unit can be executed in parallel with the formula calculation executed by the second control unit. That is, since the formula calculation of the inspection parameter and the display processing using the inspection result can be executed in parallel by different control units, it is possible to speed up a result display without affecting an inspection time.

After the execution of the imaging processing and the inspection processing by the second control unit is completed, the first control unit can execute all formula calculations set in the worksheet, and can generate a display screen on which execution results of the formula calculations are reflected. That is, an inspection tool may be skipped depending on how the inspection processing is implemented, and since a cell referred to by the skipped inspection tool is not calculated by the second control unit, a display in the worksheet is not updated. However, in the present configuration, after the completion of all imaging processing and inspection processing, formula calculations of all cells are executed, so that a display can be updated even when there is a skipped inspection tool. At this time, since the inspection processing is completed, the inspection processing is not delayed.

As described above, since the first control unit that displays the inspection result on the display unit, and the second control unit that executes the imaging processing, the inspection processing, and the formula calculation related to the imaging parameter and the inspection parameter are provided, it is possible to speed up the entire inspection by preventing the display processing from delaying the execution of the inspection processing.

DETAILED DESCRIPTION

Hereinafter, embodiments of the present invention will be described in detail with reference to the drawings. The following description of embodiments is only an essential example, and is not intended to limit the present invention, an application, or a use thereof.

Figure 1:
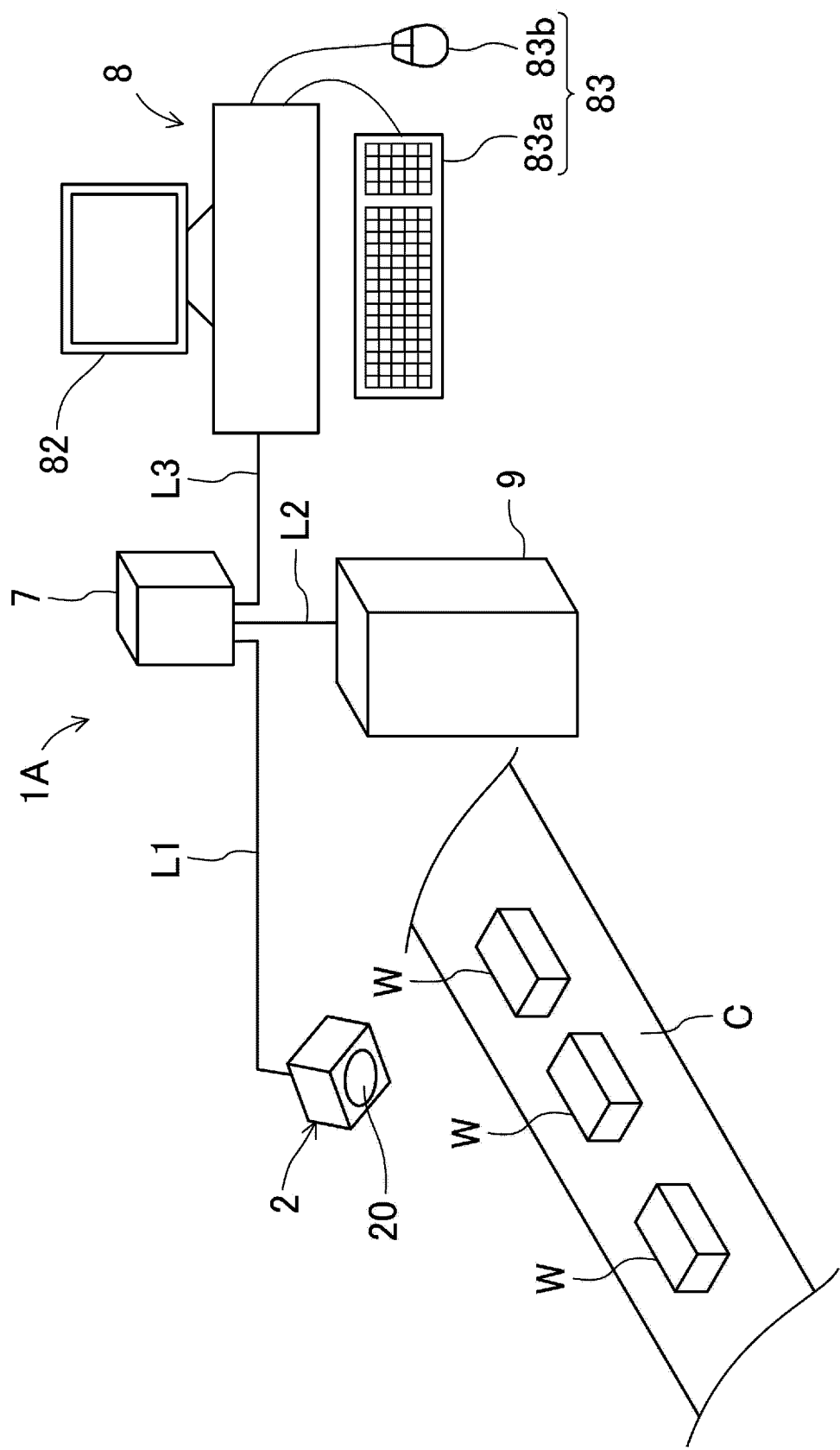
FIG. 1 is a schematic view illustrating a configuration of a first image inspection system according to an embodiment of the present invention.

First Image Inspection System FIG. 1 is a schematic diagram illustrating a configuration of a first image inspection system 1A according to an embodiment of the present invention. The image inspection system 1A is a system that performs an inspection based on a workpiece image obtained by imaging a workpiece W. The inspection includes, for example, determining whether there is a scratch, determining whether a measured dimension is within a tolerance range, determining whether the workpiece W is a non-defective product or a defective product, and the like.

FIG. 1 illustrates the first image inspection system 1A at the time of operation. The first image inspection system 1A includes a camera 2 that images the workpiece W, an image processing controller 7 that performs an inspection or the like based on a workpiece image captured by the camera 2, and a client device 8. In addition, the image inspection system 1A may also include an external device 9 such as a programmable logic controller (PLC). The external device 9 may be a component of the image inspection system 1A or may not be a component of the image inspection system 1A. In the first image inspection system 1A, inspection processing is executed by a control unit 70 included in the image processing controller 7, and the camera 2 may be a normal camera equipped with an image forming function.

Figure 3:
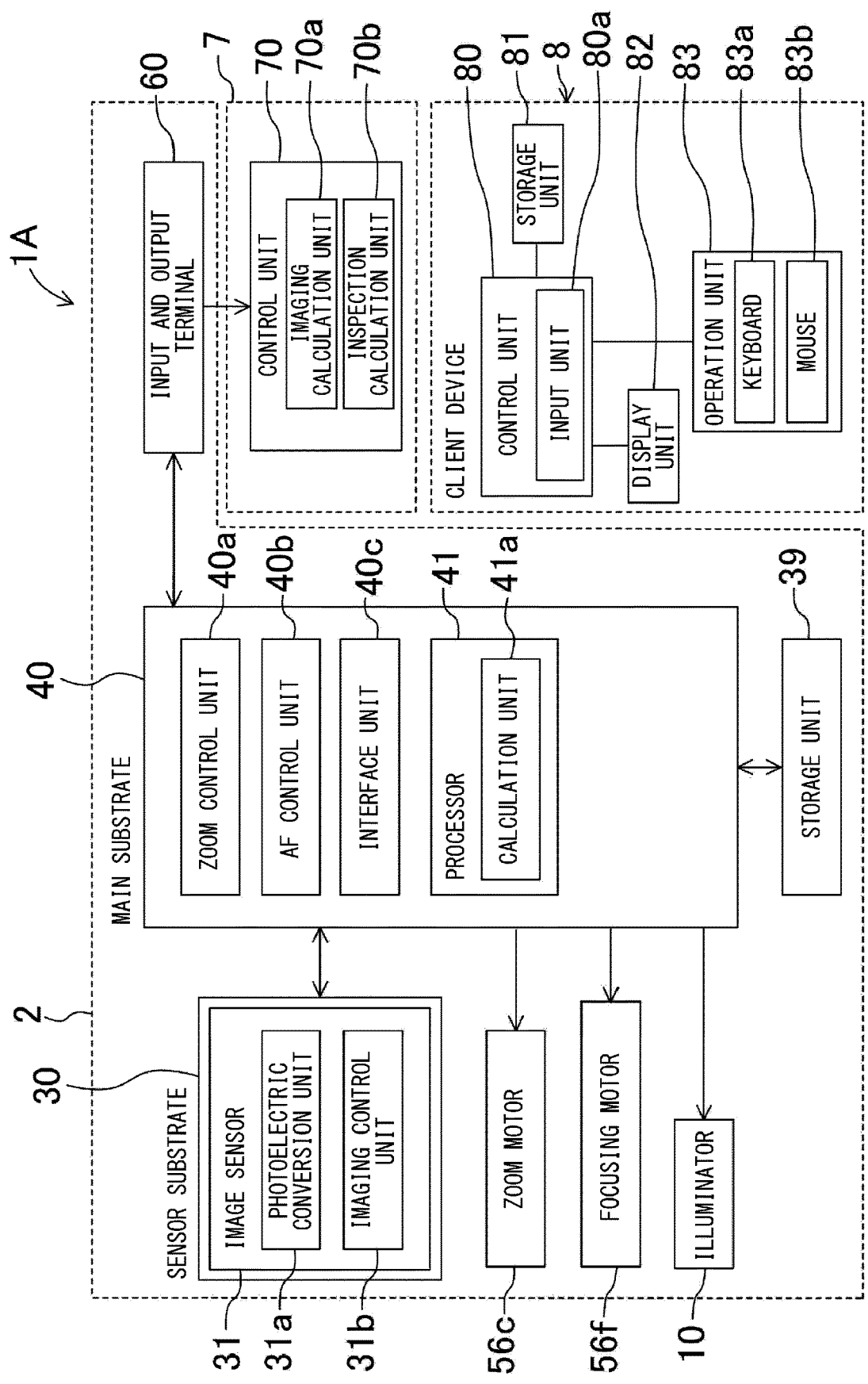
FIG. 3 is a block diagram illustrating the first image inspection system.

As illustrated in FIG. 3, the control unit 70 of the image processing controller 7 includes a CPU, a ROM, a RAM, and the like, and includes an imaging calculation unit 70a and an inspection calculation unit 70b. The control unit 70 can execute, at high speed, various kinds of image processing on a workpiece image input from the camera 2. The camera 2 of the first image inspection system 1A may be a smart camera equipped with an image inspection function in addition to the image forming function.

The first image inspection system 1A is used at a site where a plurality of workpieces W are sequentially conveyed. At such a site, the workpiece W is conveyed at a predetermined speed by a conveying device such as a belt conveyor C. The camera 2 is controlled by the external device 9, the image processing controller 7, or the like so as to image the workpiece W when the workpiece W conveyed by the belt conveyor C enters a visual field range of the camera 2. By repeating this operation, the camera 2 sequentially images a plurality of workpieces W conveyed by the belt conveyor C.

The first image inspection system 1A also includes an illuminator 10 (illustrated in FIG. 3) that irradiates the workpiece W with light when the workpiece W is imaged by the camera 2. Although a case where the illuminator 10 is provided in the camera 2 is described in the present embodiment, the illuminator 10 may be an external illuminator separate from the camera 2.

Although not illustrated, the camera 2 can image a workpiece W that is stopped. Further, the camera 2 can be operated in a state of being attached to, for example, a robot arm, and an operation form of the first image inspection system 1A is not particularly limited.

The workpiece W may have any shape and size. The workpiece W includes, for example, a metal workpiece having a glossy surface.

Figure 2:
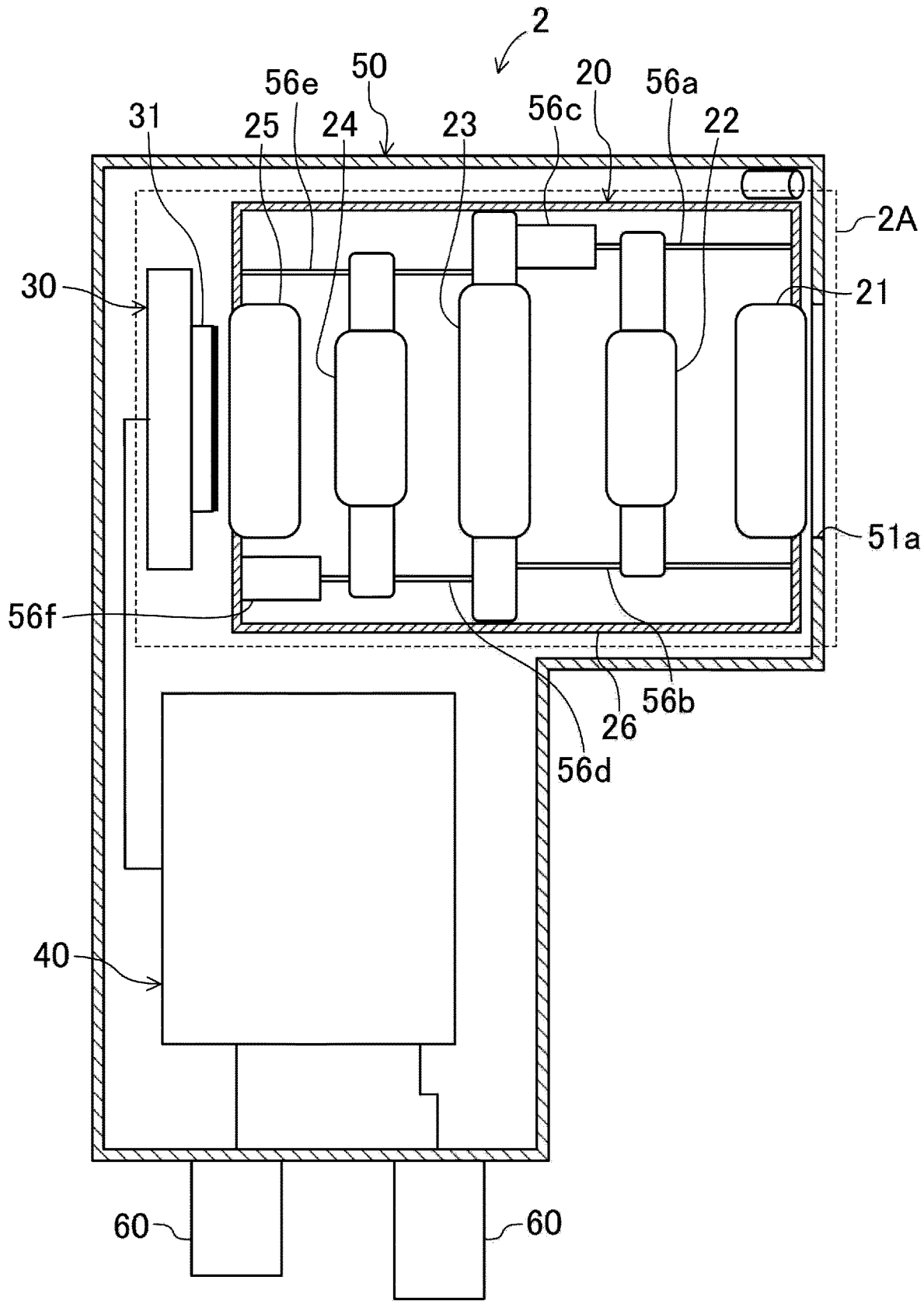
FIG. 2 is a cross-sectional view illustrating an internal structure of a camera.

As illustrated in FIG. 2, the camera 2 includes a lens unit 20, a sensor substrate 30, a main substrate 40, a housing 50, and a storage unit 39 (illustrated in FIG. 3). The storage unit 39 stores setting information of the camera 2, various images, and the like.

The lens unit 20 provided in the camera 2 is a zoom lens including a zoom optical system capable of electrically performing optical zooming, and an optical zoom magnification can be switched to any magnification within a predetermined range. The lens unit 20 is fixed to the housing 50 and is integrated with the housing 50.

The lens unit 20 includes a first lens group 21, a second lens group 22, a third lens group 23, a fourth lens group 24, a fifth lens group 25, and a lens barrel 26 that holds the first to fifth lens groups 21 to 25. The first to fifth lens groups 21 to 25 constitute a condenser lens that condenses light incident from a light receiving window 51a formed in the housing 50. The number of lenses constituting each lens group of the first to fifth lens groups 21 to 25 is not particularly limited, and may be any number. The number of lens groups may be four or less, or may be six or more. The lens unit 20 may be a zoom optical system capable of manually performing optical zooming.

The first lens group 21 is a fixed lens group fixed to the housing 50, and receives reflected light from the workpiece W. The second lens group 22 is a zooming movable lens group disposed behind the first lens group 21, and receives light emitted from the first lens group 21. The third lens group 23 is a fixed lens group disposed behind the second lens group 22, and receives light emitted from the second lens group 22. The fourth lens group 24 is a focusing lens group (a movable lens group) including a non-telecentric lens and disposed behind the third lens group 23, and receives light emitted from the third lens group 23. The fifth lens group 25 is a fixed lens group disposed behind the fourth lens group 24, and receives light emitted from the fourth lens group 24.

The lens barrel 26 is provided with a zoom ball screw 56a, a zoom guide shaft 56b, and a zoom motor 56c that rotates the zoom ball screw 56a in forward and backward directions. The second lens group 22 is supported by the zoom ball screw 56a and the zoom guide shaft 56b, and when the zoom ball screw 56a is rotated by the zoom motor 56c, the second lens group 22 is moved in an optical axis direction, thereby obtaining a desired zoom magnification. The zoom ball screw 56a, the zoom guide shaft 56b, and the zoom motor 56c are a zoom lens drive mechanism that drives the second lens group 22 in the optical axis direction and adjusts an optical magnification.

The lens barrel 26 is also provided with a focusing ball screw 56d, a focusing guide shaft 56e, and a focusing motor 56f that rotates the focusing ball screw 56d in forward and backward directions. The fourth lens group 24 is supported by the focusing ball screw 56d and the focusing guide shaft 56e, and when the focusing ball screw 56d is rotated by the focusing motor 56f, the fourth lens group 24 is moved in an optical axis direction, thereby performing a focus adjustment. The focusing ball screw 56d, the focusing guide shaft 56e, and the focusing motor 56f are a focusing lens drive mechanism that drives the fourth lens group 24 in the optical axis direction and adjusts a focal position, and the focusing motor 56f is a lens drive unit that adjusts a lens position of the fourth lens group 24.

As illustrated in FIG. 3, the main substrate 40 is provided with a zoom control unit 40a, an AF control unit 40b, and an interface unit 40c. The interface unit 40c is a part that receives various instructions and designations from a user and outputs a result calculated by the main substrate 40, a workpiece image, and the like to the image processing controller 7 or the external device 9. For example, data of a workpiece image formed by an imaging unit 2A illustrated in FIG. 2 is output to the image processing controller 7 via the interface unit 40c and an input and output terminal 60.

When the interface unit 40c receives, for example, a zoom instruction for performing optical zooming, the zoom control unit 40a controls the zoom motor 56c to move the second lens group 22 in the optical axis direction so as to obtain a zoom magnification received by the interface unit 40c.

The AF control unit 40b is a part that performs automatic focus control of a known contrast method in the related art or a phase difference method. The AF control unit 40b controls the focusing motor 56f to move the fourth lens group 24 in the optical axis direction so that a focal position is aligned with the workpiece W.

As illustrated in FIG. 2, the sensor substrate 30 is disposed behind the fifth lens group 25. An image sensor 31 is mounted on the sensor substrate 30. The image sensor 31 and the lens unit 20 constitute the imaging unit 2A for forming a workpiece image.

The image sensor 31 has a light receiving surface implemented by a large number of light receiving elements, and specifically, as illustrated in FIG. 3, the image sensor 31 includes a photoelectric conversion unit 31a that receives light condensed by the first to fifth lens groups 21 to 25 of the lens unit 20, and an imaging control unit 31b that forms a workpiece image based on an electric signal converted by the photoelectric conversion unit 31a. The photoelectric conversion unit 31a is, for example, a CMOS imaging element.

The storage unit 39 of the camera 2 illustrated in FIG. 3 is implemented by, for example, a semi-conductor memory. The storage unit 39 stores an imaging parameter. The imaging parameter includes at least one of an exposure time of the imaging unit 2A, a focus position of an optical system provided in the imaging unit 2A, a zoom magnification of a zoom optical system provided in the imaging unit 2A, and a gain of the imaging unit 2A.

The imaging parameter stored in the storage unit 39 is reflected when a workpiece image is formed by the imaging unit 2A. The workpiece image formed by the imaging unit 2A is output from the input and output terminal 60 to the image processing controller 7.

The client device 8 is implemented by a desktop personal computer, a notebook personal computer, and the like, and includes a control unit 80, a storage unit 81, a display unit 82, and an operation unit 83. The control unit 80 includes a central processing unit, a ROM, a RAM, and the like. The storage unit 81 includes a hard disk drive, a solid state drive, and the like. The storage unit 81 stores a program to be executed by the control unit 80, a workpiece image, various kinds of setting information, and the like. The control unit 80 corresponds to a first control unit and is operated in the client device 8.

The operation unit 83 includes a keyboard 83a, a mouse 83b, and the like. The keyboard 83a and the mouse 83b are examples of members for operating the image inspection system 1A, and operation states of the keyboard 83a and the mouse 83b are detected by an input unit 80a. The operation unit 83 is not limited to the keyboard 83a and the mouse 83b, and may be a so-called touch panel type operation unit. The display unit 82 includes a liquid crystal display device and the like, and is controlled by the control unit 80 to display various setting screens for setting the image inspection system 1A, various images, and the like. A touch panel type operation unit may be incorporated in the display unit 82.

Figure 4:
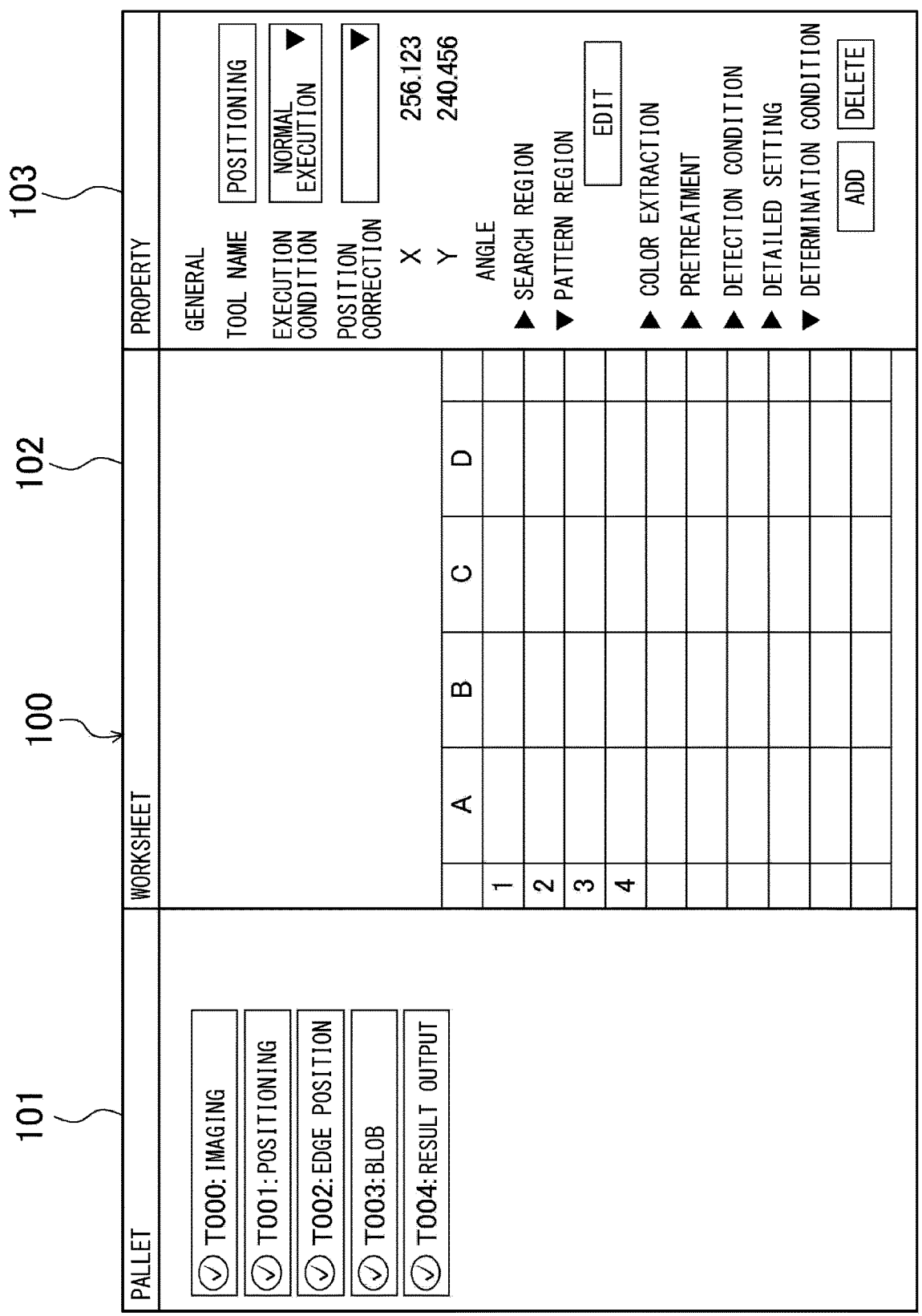
FIG. 4 is a view illustrating an example of a setting screen having a worksheet region.

The control unit 80 generates a setting screen on which a formula setting of an imaging parameter of the imaging unit 2A, a formula setting of an inspection parameter of a workpiece image, and a display setting of an inspection result can be set in cells of a worksheet, and displays an inspection result on the display unit 82 according to the display setting set in a cell of the worksheet. Specifically, the control unit 80 generates a setting screen 100 as illustrated in FIG. 4. The setting screen 100 includes a palette region 101, a worksheet region 102, and a property region 103. The palette region 101 is a region for arranging a plurality of tools necessary for an image inspection. Since four tools of an imaging tool, a positioning tool, an inspection tool, and an output tool are required in an image inspection, a plurality of tools including at least four tools can be arranged in the palette region 101.

When tools are arranged in the palette region 101, for example, a drag and drop operation of dragging a tool on the setting screen 100 in a selected state using the operation unit 83 and dropping the tool to any position of the palette region 101 can be performed. By repeating such an operation, a plurality of tools can be easily arranged at any positions in the palette region 101. A position of a tool arranged in the palette region 101 can be corrected. A tool arranged in the palette region 101 can be deleted.

The imaging tool is related to an imaging setting of the camera 2, and may include, for example, a tool related to an image correction. The positioning tool is related to a positioning setting for performing positioning of an inspection region on a workpiece image captured by the camera 2, and may include, for example, a tool related to a pattern search, an edge detection, and blob processing. The inspection tool is related to an inspection setting for setting inspection contents for the positioned inspection region, and may include, for example, a tool related to a presence or absence inspection, a scratch inspection, a dimension measurement, and a blob analysis (such as counting blobs). The output tool is related to an output setting for performing a setting related to an output of an inspection result, and may include, for example, a tool related to a result output or an image output.

In an image inspection, since imaging processing executed by the camera 2 is first executed, the imaging tool can be arranged at a most upstream side. After the imaging processing executed by the camera 2, since positioning processing of an inspection region is executed, the positioning tool can be arranged next to the imaging tool. After the positioning processing, since an inspection for the inspection region is executed, the inspection tool can be arranged next to the positioning tool. After the inspection processing, since output processing of an inspection result is executed, the output tool can be arranged at a most downstream side. Although a flow of an inspection is set such that the most upstream of an image inspection is positioned at an upper side and the most downstream is positioned at a lower side in the example illustrated in FIG. 4, the tool arrangement is not limited thereto. In this manner, an inspection sequence can be set in the palette region 101.

There is no limitation on the degree of freedom of layout positions of tools as long as the tools are arranged within the palette region 101. Therefore, it is possible to arrange a plurality of tools at free positions regardless of a program state, and for example, it is easy to perform categorization or the like according to an inspection location.

The palette region 101 is suitable for complicated image processing. That is, the palette region 101 is configured such that a tool having a program element can be set so as to cope with complicated image processing. That is, the input unit 80a provided in the control unit 80 can receive inputs such as conditional branching, repetition, routine, routine schedule, and event issuance. The input conditional branching and the like is reflected in an image inspection and stored in the storage unit 81.

The worksheet region 102 is a region for referring to and calculating data related to a plurality of tools arranged in the palette region 101, and has a plurality of cells. The cells in the worksheet region 102 are arranged in a vertical direction and a horizontal direction.

Parameters serving as detailed settings of the tools arranged in the palette region 101 can be set in the property region 103. The parameters can be set via the operation unit 83. As an example of a procedure, a user operates the operation unit 83 to select a tool for setting a parameter from a plurality of tools arranged in the palette region 101. The tool selection operation is received by the input unit 80a provided in the control unit 80. When setting a parameter of the selected tool, a user operates the operation unit 83. This operation is also received by the input unit 80a, and the input various parameters are reflected and stored in the storage unit 81. For example, a tool name can be input, executability can be set, and output data can be selected in the property region 103. The property region 103 may be provided as necessary, and may be omitted.

Figure 5:
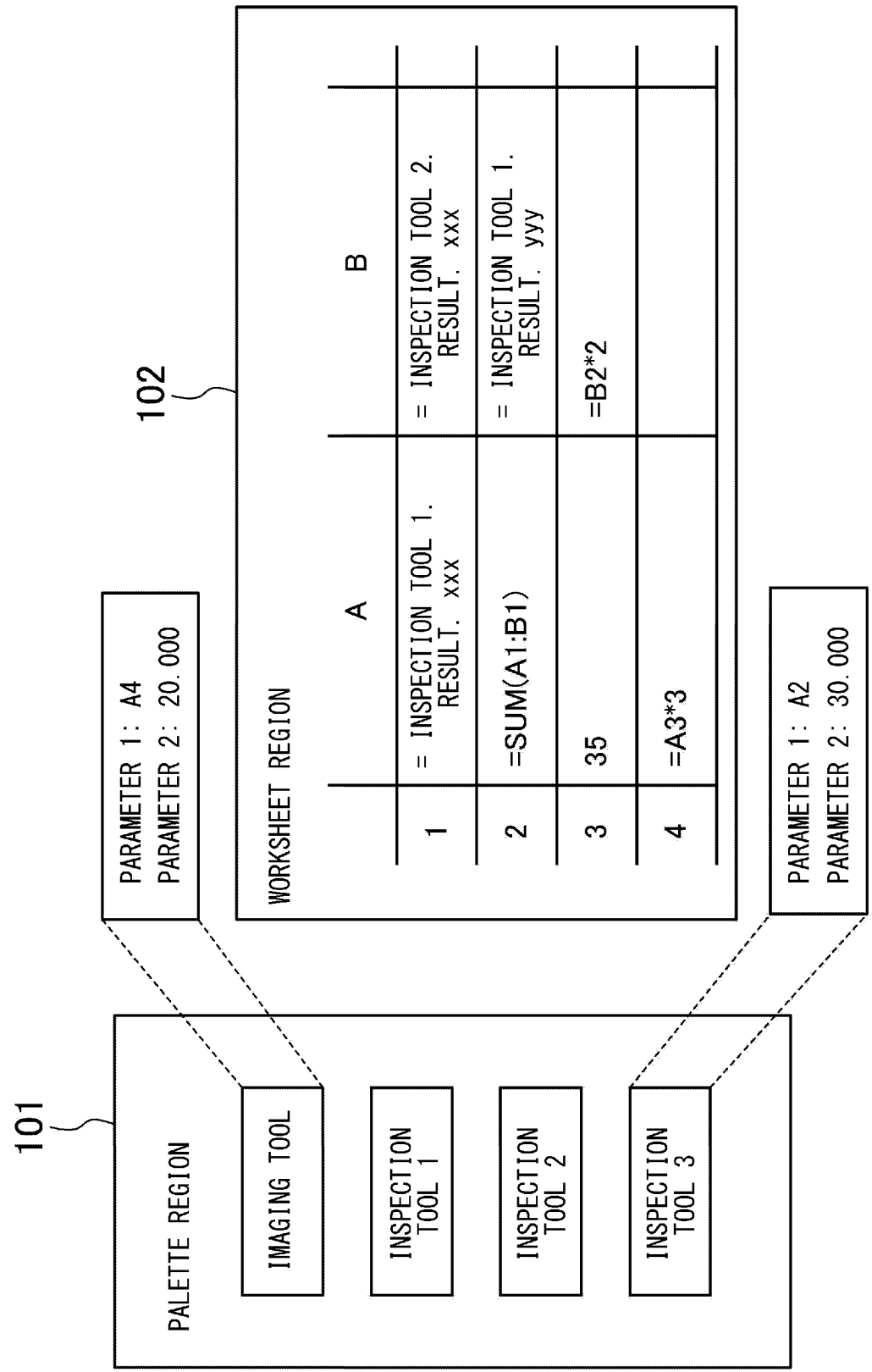
FIG. 5 is a diagram illustrating an input example of a palette region and the worksheet region.

FIG. 5 is a diagram illustrating an input example of the palette region 101 and the worksheet region 102. An imaging tool, an inspection tool 1, an inspection tool 2, and an inspection tool 3 are arranged in the palette region 101. Formulas are input to cells A2, A4, and B3 in the worksheet region 102. Inputting a formula into a cell is called a formula setting. The formula setting includes a formula setting of an imaging parameter of the imaging unit 2A, a formula setting of an inspection parameter of a workpiece image, and the like. A display setting of an inspection result can also be set in a cell in the worksheet region 102, and for example, the display setting of an inspection result is set in cells A1, B1, and B2.

A parameter 1 "A4" and a parameter 2 "20.000" are set for the imaging tool in the palette region 101. The parameter 1 "A4" indicates to refer to the cell A4 in the worksheet region 102, and a value derived by a formula input to the cell A4 is the parameter 1 of the imaging tool. A parameter 1 "A2" and a parameter 2 "30.000" are set for the inspection tool 3 in the palette region 101. The parameter 1 "A2" indicates to refer to the cell A2 in the worksheet region 102, and a value derived by a formula input to the cell A2 is the parameter 1 of the inspection tool 3.

The control unit 70 of the image processing controller 7 is configured to analyze a reference relationship among the imaging tool and the inspection tools arranged in the palette region 101 and the cells in the worksheet region 102, and automatically specify a formula calculation set in the worksheet region 102 based on the analysis result. For example, since blob analyzing processing needs to refer to a result of edge extraction processing, an analysis of a reference relationship is executed in consideration of an execution order at the time of executing such an inspection. When the edge extraction processing is executed by a first inspection tool and the blob analyzing processing is executed by a second inspection tool, an inspection parameter of the second inspection tool that executes processing based on an inspection result of the first inspection tool is included in the inspection parameter, and an execution order of the inspection tools can be appropriately set based on the inspection parameter.

When a reference relationship is analyzed, the control unit 70 of the image processing controller 7 can determine an execution order of tools at the time performing an inspection by referring to identification information assigned to the plurality of tools arranged on the palette region 101, analyzing a dependency relationship based on processing contents of the identification information, and executing a sort algorithm. Although it is preferable to use topological sort as the sort algorithm, the sort algorithm is not limited to topological sort. The dependency relationship may include a specific order in which the positioning tool executes processing after the imaging tool, the inspection tool executes processing after the positioning tool, and the output tool executes processing after the inspection tool. In this case, the control unit 70 of the image processing controller 7 refers to a category of the imaging tool, the positioning tool, the inspection tool, and the output tool to which each of the plurality of tools arranged in the palette region 101 belongs. Then, based on the obtained category, the control unit 70 of the image processing controller 7 determines an execution order of the tools at the time of performing an inspection so as to maintain an order.

Figure 6:
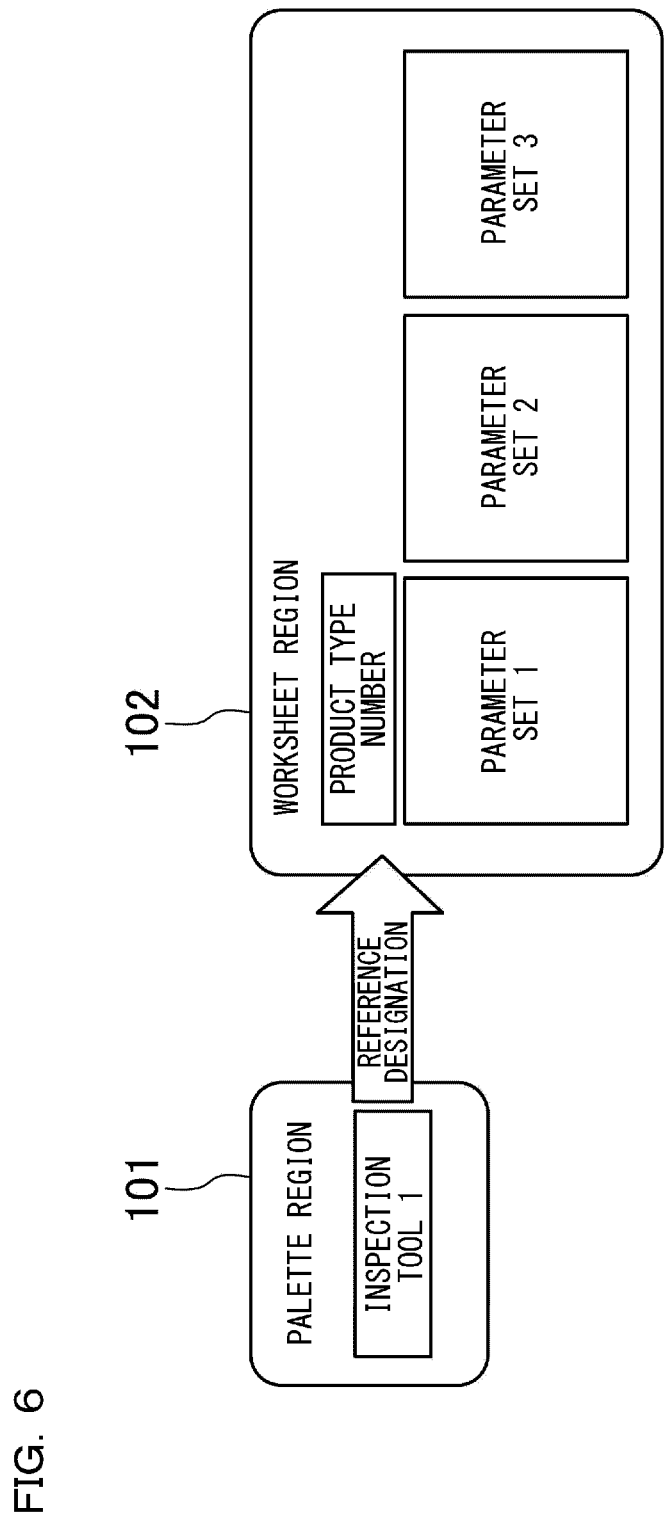
FIG. 6 is a diagram illustrating a first image inspection example.

FIG. 6 is a diagram illustrating a first image inspection example. An inspection sequence of a first image inspection includes only one inspection tool 1. A parameter table of the inspection tool 1 is set in the worksheet region 102, and a parameter applied by the inspection tool 1 is switched for each type of workpiece. For example, when a product type number of a workpiece is 1, the inspection tool 1 executes processing by applying a parameter set 1 set in the worksheet region 102, when a product type number of a workpiece is 2, the inspection tool 1 executes processing by applying a parameter set 2 set in the worksheet region 102, and when a product type number of a workpiece is 3, the inspection tool 1 executes processing by applying a parameter set 3 set in the worksheet region 102.

Figure 7:
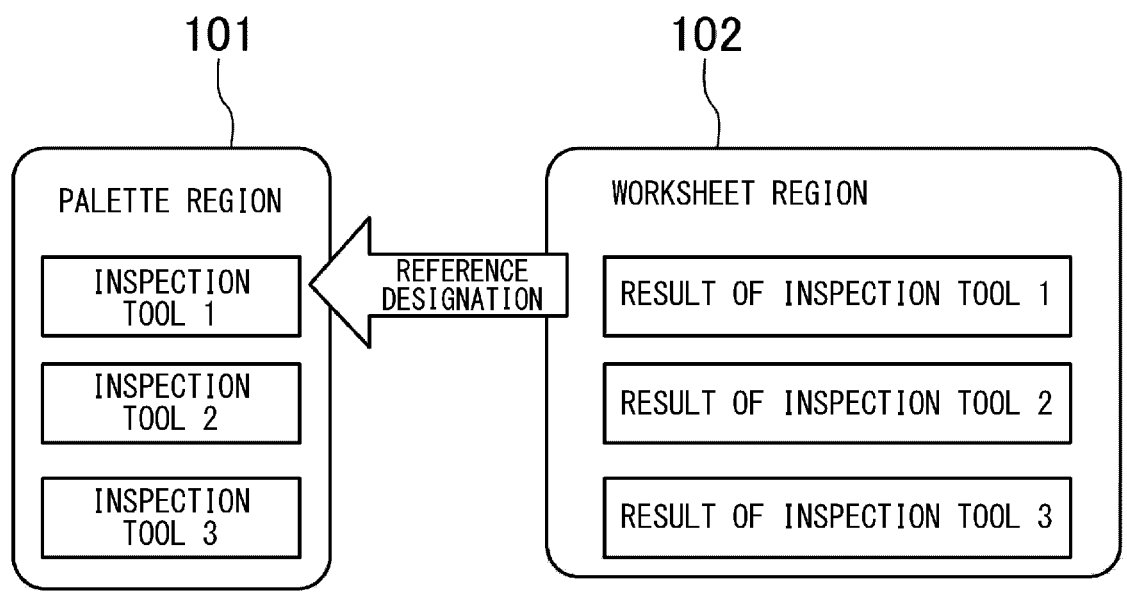
FIG. 7 is a diagram illustrating a second image inspection example.

FIG. 7 is a diagram illustrating a second image inspection example. An inspection sequence of a second image inspection includes three tools of an inspection tool 1, an inspection tool 2, and an inspection tool 3. In the second image inspection, results obtained by a plurality of inspection tools are arranged in the worksheet region 102, and a result list display can be customized.

Figure 8:
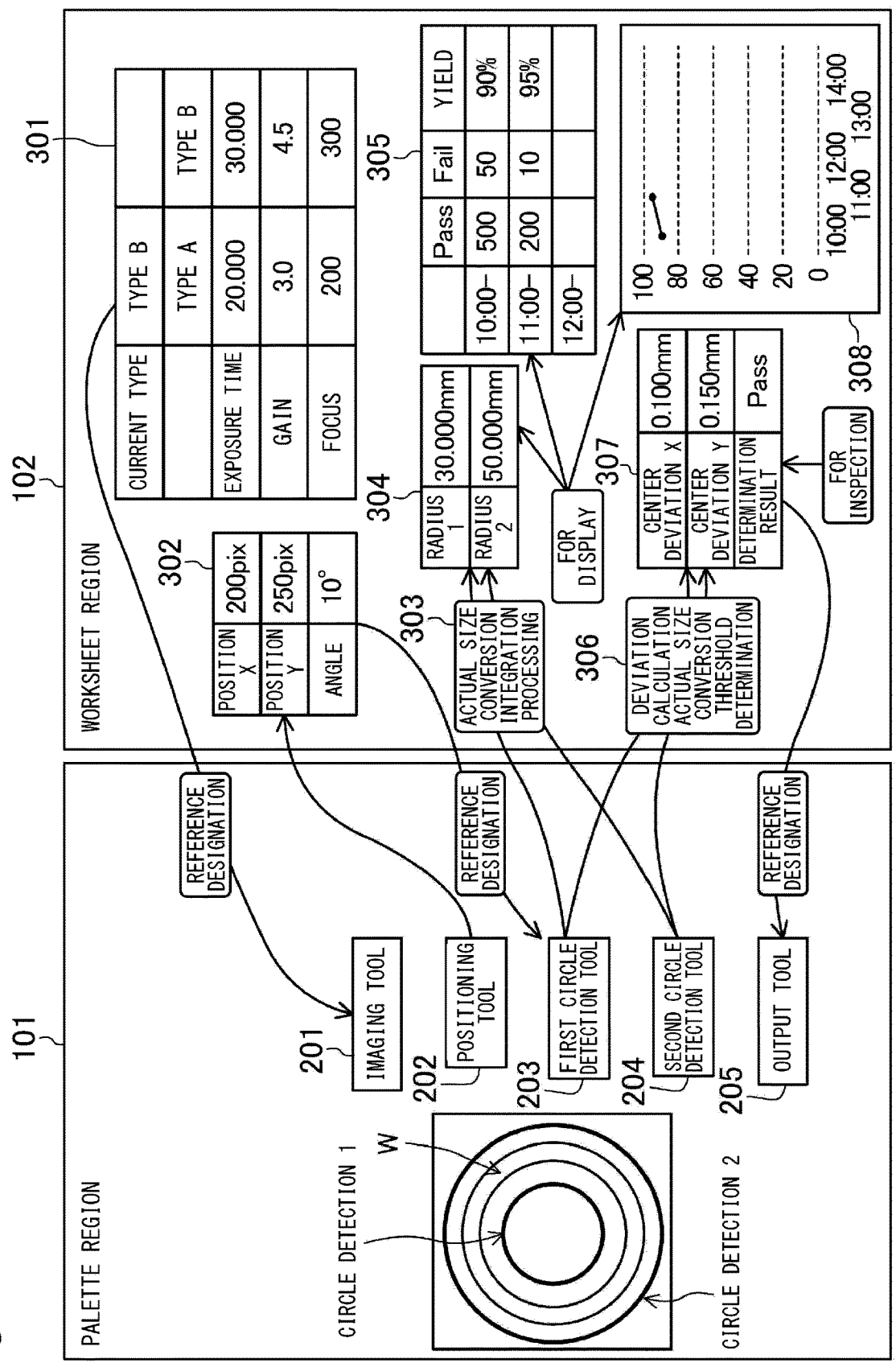
FIG. 8 is a diagram illustrating a specific example of an image inspection when a workpiece is a bearing.

FIG. 8 is a diagram illustrating a specific example of an image inspection when the workpiece W is a bearing, and is an example in which a dimensional inspection of an inner diameter and an outer diameter of the bearing is performed. An imaging tool 201, a positioning tool 202, a first circle detection tool 203 for detecting the inner diameter of the bearing, a second circle detection tool 204 for detecting the outer diameter of the bearing, and an output tool 205 are arranged in the palette region 101, and an inspection sequence is implemented by the five tools 201 to 205.

The worksheet region 102 is provided with first to eighth regions 301 to 308. The first region 301 is a region in which parameters applied to the imaging tool 201 are input. The control unit 80 determines whether a current type of the workpiece W is a type A or a type B based on a signal input from the external device 9, and determines a parameter table corresponding to the determined type. Parameters of the determined parameter table are applied when the imaging tool 201 executes processing.

The second region 302 is a region in which parameters applied to the positioning tool 202 are input, and the positioning tool 202 performs a search for positioning by applying the parameters input to the second region 302. Specifically, an example of inspection parameters includes information for specifying a position on an image coordinate system to which an inspection tool such as the first circle detection tool 203 and the second circle detection tool 204 is applied. Information for specifying a position on the image coordinate system includes a position x, a position y, an angle, and the like, and based on this information, it is possible to specify which part of a workpiece image is an application region (a region to be inspected) of an inspection tool. The first circle detection tool 203 and the second circle detection tool 204 correct a positional deviation amount detected by the positioning tool 202, and then respectively perform a circle detection for the inner diameter and a circle detection for the outer diameter.

In addition, the inspection parameter may include a search region and a search parameter of a positioning tool that searches for a region to be inspected. That is, before applying the first circle detection tool 203 and the second circle detection tool 204 to a region to be inspected in a workpiece image, the positioning tool 202 searches for a region to be inspected based on the search region and the search parameter. The search parameter includes, for example, rotation, translation, and scale.

In the third region 303, a formula is set for performing an actual size conversion on outputs from the first circle detection tool 203 and the second circle detection tool 204 to execute integration processing. This formula setting corresponds to information related to cooperation of a plurality of inspection tools, and the information related to cooperation of a plurality of inspection tools is included in the inspection parameter.

Specifically, a deviation amount between center positions of the inner diameter and the outer diameter respectively detected by the first circle detection tool 203 and the second circle detection tool 204 is calculated, and then a detection result in units of pixel is converted into an actual size (for example, mm). The fourth region 304 includes a display setting of the inspection result, and includes a setting for displaying, in radius, an output from the first circle detection tool 203 and a setting for displaying, in radius, an output from the second circle detection tool 204. Conversion results "radius 1" and "radius 2" are not output to the external device 9, and are displayed as reference information. The "radius 1" and the "radius 2" may not be displayed on the display unit 82.

In the fifth region 305, the number of times based on a determination result for each predetermined time (one hour) is integrated and a formula for calculating a yield is set.

In the sixth region 306, threshold determination is performed on the deviation amount calculated based on the output results of the first circle detection tool 203 and the second circle detection tool 204. The deviation amount may be output to the external device 9 as byte data, and results may be accumulated.

In the seventh region 307, a determination result to be referred to by the output tool 205 is acquired. The determination result is output to the external device 9 as bit data, and for example, is used as determination information when a non-defective product and a defective product are sorted. A display setting of the non-defective product and the defective product acquired by the inspection processing can be set, and accordingly the non-defective product and the defective product can be displayed on the display unit 82. In the eighth region 308, a formula is set to draw a graph for displaying the calculation result of the yield in the fifth region 305. A display setting of the graph may be a graph display of the number of non-defective products and the number of defective products acquired by the inspection processing, and for example, a histogram can be displayed on the display unit 82. In this case, the control unit 80 of the client device 8 acquires the display setting set in a cell of the worksheet, and displays a graph using an inspection result of an inspection tool on the display unit 82 according to the acquired display setting. The display setting may include a setting for displaying a workpiece image subjected to the inspection processing. Accordingly, the workpiece image subjected to inspection processing can be displayed on the display unit 82. Further, the image inspection system 1A according to the present embodiment can use the fifth region 305 in which the determination result is displayed in a table format and the eighth region 308 in which the determination result is displayed in a graph format as a part of a screen (an operation screen) on which an operation state is displayed during an operation, and further the image inspection system 1A can update the fifth region 305 and the eighth region 308 in real time. Accordingly, it is possible to visualize a state of a site such as a production state in real time. Since the control unit 80 of the client device 8 executes high-load processing of updating a display in real time, an influence on inspection processing and imaging processing can be prevented.

In addition, when a robot that conveys the workpiece W is installed at a subsequent stage, dimensions of the outer diameter and the inner diameter and coordinates of the center positions may be output and input to a robot control device. In this case, the control unit 70 of the image processing controller 7 executes a radius actual dimension conversion and a coordinate calculation.

Figure 9:
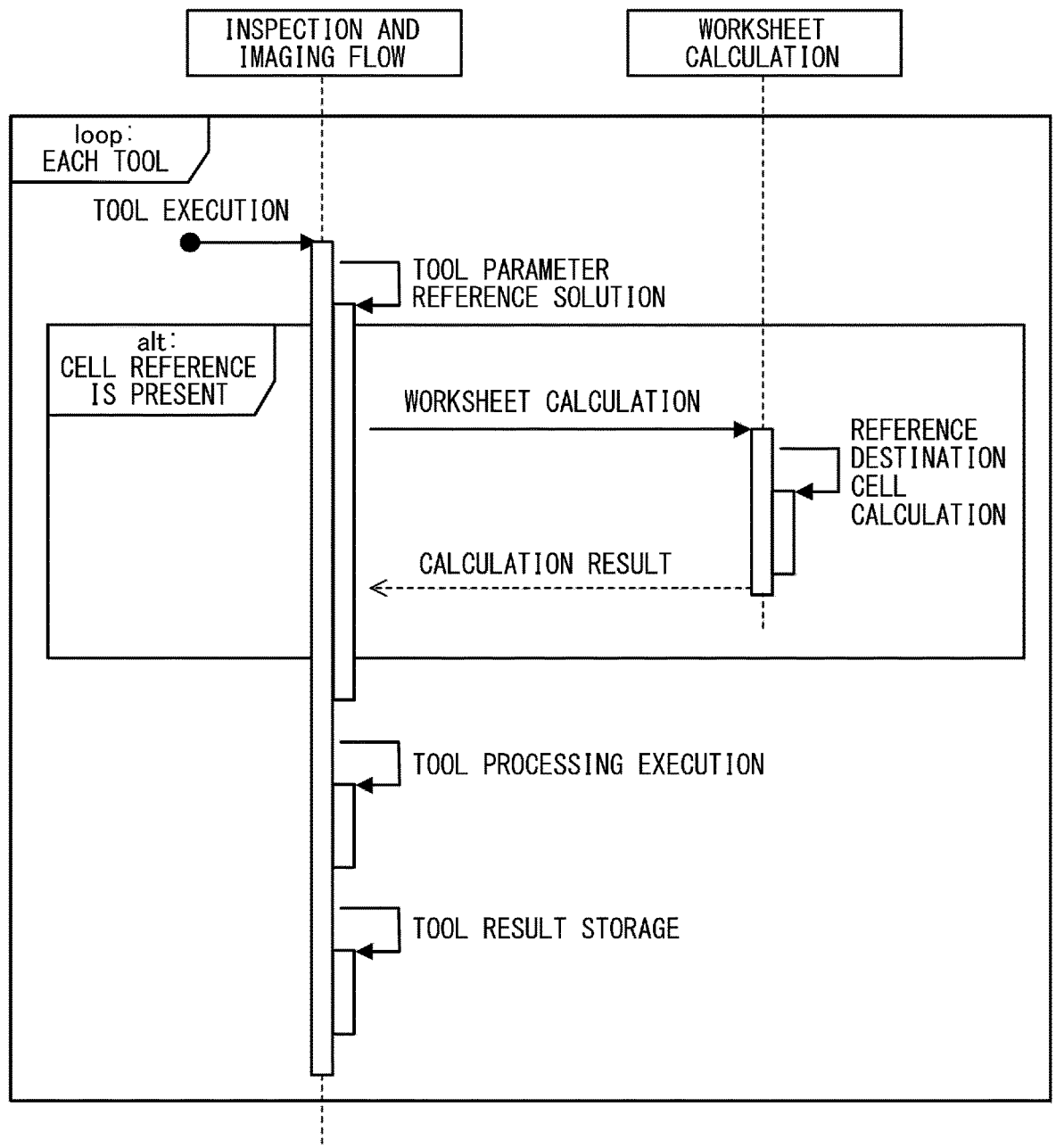
FIG. 9 is a diagram illustrating a procedure of processing executed by an image processing controller.

FIG. 9 is a diagram illustrating a procedure of the inspection processing and the imaging processing executed by the image processing controller 7, and illustrates an inspection and imaging flow and a worksheet calculation (a calculation based on a formula setting set in the worksheet region 102) in association with each other. When an instruction for a tool to execute processing is received, a reference of a parameter applied by the tool is solved before the tool executes processing. When the parameter refers to a cell of the worksheet region 102, worksheet calculation processing is executed at the time of reference resolution, and a calculation result is stored as the parameter. Thereafter, the tool executes processing and a result is stored. At this time, only a cell referred to by the tool is subjected to the worksheet calculation processing. Accordingly, calculation processing of a cell added for display is not executed. The cell added for display is, for example, a cell in the fourth region 304, a cell in the fifth region 305, and a cell in the eighth region 308 illustrated in FIG. 8. As described above, the control unit 70 of the image processing controller 7 can cause the imaging unit 2A to execute imaging processing, can execute inspection processing on a workpiece image, and can execute a formula calculation related to an imaging parameter and an inspection parameter set in a worksheet. The imaging calculation unit 70a is a unit that executes a formula calculation of the imaging parameter, and the inspection calculation unit 70b is a unit that executes a formula calculation of the inspection parameter. In this manner, since the imaging calculation unit 70a and the inspection calculation unit 70b are provided, the formula calculation of the imaging parameter by the imaging calculation unit 70a and the formula calculation of the inspection parameter by the inspection calculation unit 70b can be executed in parallel, and a processing speed can be increased. The control unit 70 is a second control unit and is operated in the image processing controller 7 connected to the client device 8.

Figure 10:
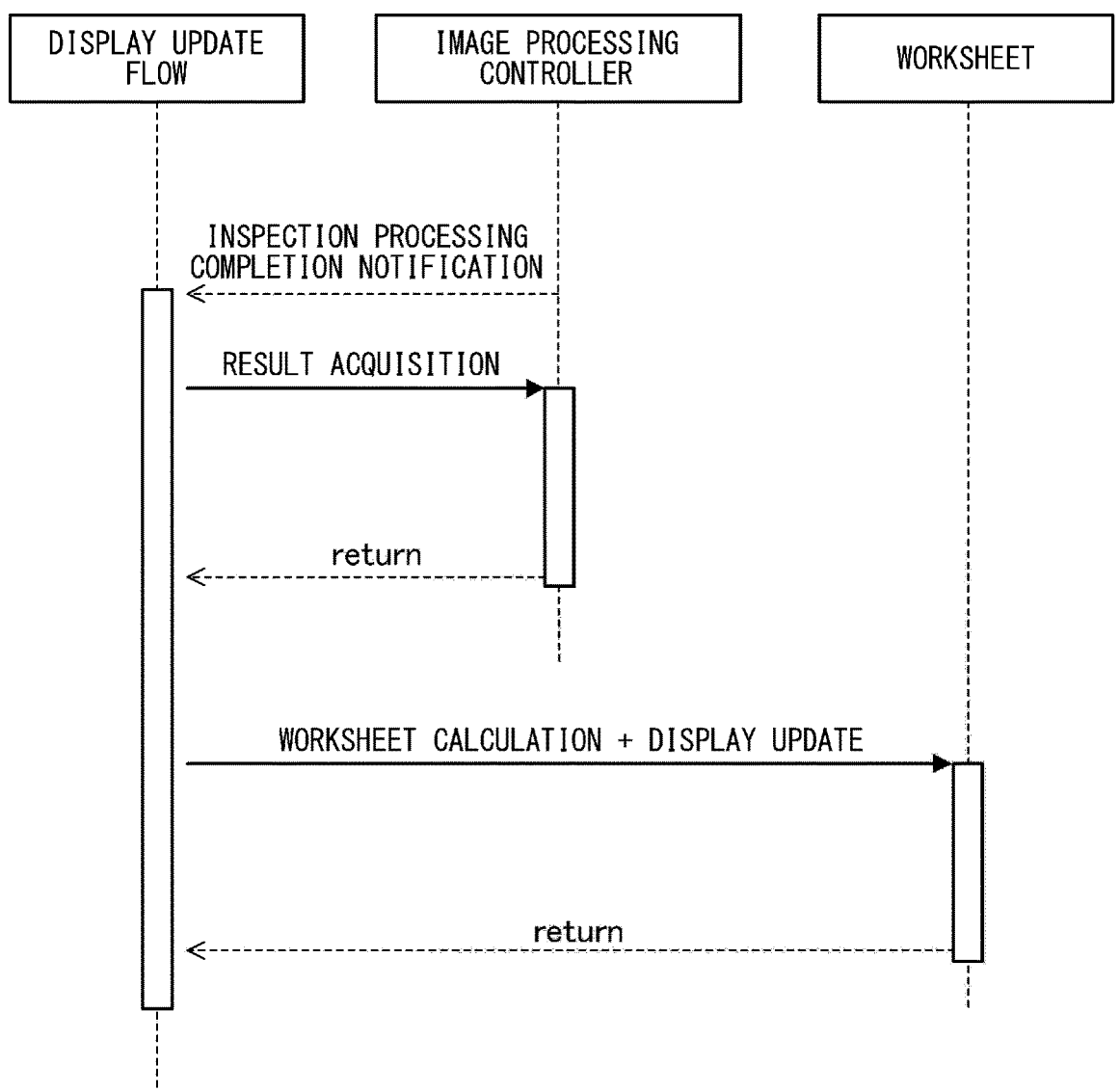
FIG. 10 is a diagram illustrating a procedure of processing executed by a client device.

FIG. 10 is a diagram illustrating a procedure of display update processing (an example of display processing) executed by the client device 8. A display update flow is executed after the control unit 80 of the client device 8 receives a notification indicating that the inspection processing of the image processing controller 7 illustrated in FIG. 9 is completed (an inspection processing completion notification). When the control unit 80 of the client device 8 requests the image processing controller 7 to acquire a result, the acquired result is transmitted from the image processing controller 7 and the control unit 80 of the client device 8 receives the acquired result. When the control unit 80 of the client device 8 acquires an inspection result of the image processing controller 7, the control unit 80 executes a calculation of a worksheet region and the display update processing according to contents of the acquired inspection result. All cells in the worksheet region are to be displayed and calculated. Accordingly, cells that are not included in a calculation target of the image processing controller 7 illustrated in FIG. 9 are also updated in the flow illustrated in FIG. 10.

For example, when the inspection tool 3 (illustrated in FIG. 7) is skipped in a certain inspection sequence, since a cell of the worksheet region 102 referred to by the inspection tool 3 is not calculated by the image processing controller 7, nothing may be displayed on the worksheet. In this case, the cell referred to by the inspection tool 3 is not displayed even when the cell includes an inspection result of the inspection tool 1 or the inspection tool 2 that executes processing or a calculation result using the inspection result. Therefore, by setting all cells as calculation targets of the control unit 80 of the client device 8, the inspection result of the inspection tool 1 or the inspection tool 2 and the calculation result using the inspection result can be displayed (updated) in the worksheet. At this time, after execution of the imaging processing and the inspection processing by the control unit 70 of the image processing controller 7 is completed, the control unit 80 of the client device 8 can execute all formula calculations set in the worksheet, generate a display screen on which execution results of the formula calculations are reflected, and display the display screen on the display unit 82.

The image processing controller 7 may notify the control unit 80 of the client device 8 of the inspection result after the entire inspection sequence is completed, or may notify the control unit 80 of the client device 8 of the inspection result for each inspection tool that completes execution of processing even when the entire inspection sequence is not completed.

When the inspection processing involves the first inspection tool and the second inspection tool that executes processing after the first inspection tool, after execution of processing by the first inspection tool is completed, the control unit 70 of the image processing controller 7 transmits a completion notification of the first inspection tool and a first inspection result of the first inspection tool to the control unit 80 of the client device 8, and starts a formula calculation of an inspection parameter of the second inspection tool. The control unit 80 of the client device 8 can cause the display unit 82 to display a part of the inspection result by starting execution of display processing using the first inspection result according to the display setting in the worksheet. The display processing executed by the control unit 80 of the client device 8 can be executed in parallel with the formula calculation executed by the control unit 70 of the image processing controller 7. As described above, since the formula calculation of the inspection parameter and the display processing using the inspection result can be executed in parallel by the different control units 70 and 80, it is possible to speed up a result display without affecting an inspection time.

Second Image Inspection System

Figure 11:
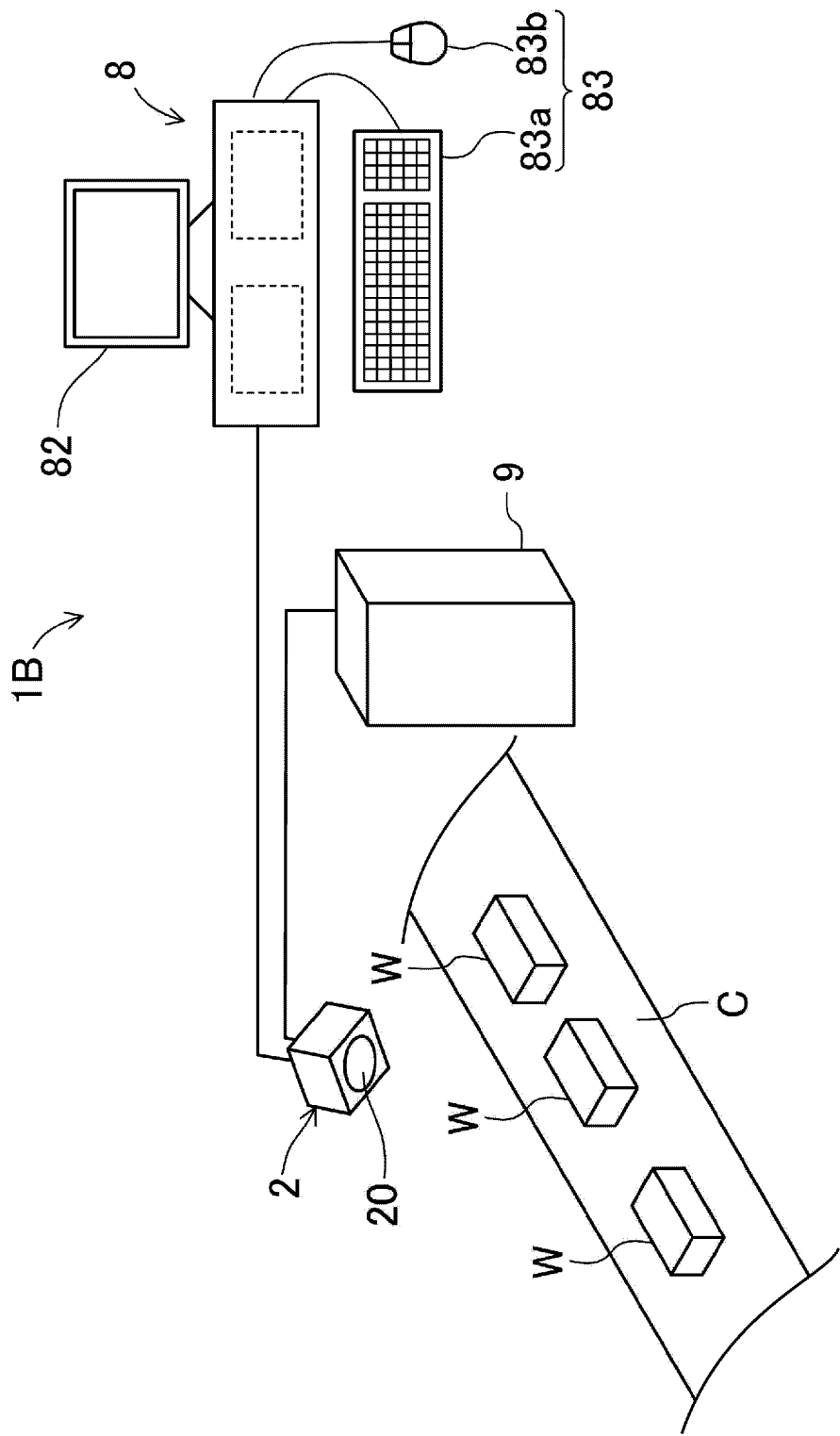
FIG. 11 is a schematic diagram illustrating a configuration of a second image inspection system according to the embodiment of the present invention.

FIG. 11 illustrates an operation state of a second image inspection system 1, and the second image inspection system 1B includes the camera 2 that images the workpiece W and performs an inspection based on a workpiece image obtained by imaging the workpiece W, and the client device 8. Similar to the first image inspection system 1A, the second image inspection system 1B may or may not include the external device 9.

In the second image inspection system 1B, inspection processing is performed by the camera 2, and the camera 2 is a smart camera equipped with an image inspection function in addition to an image forming function. The configuration of the camera 2 is the same as that illustrated in the block diagram of FIG. 3. The imaging processing of the imaging unit 2A, the inspection processing on a workpiece image, and a formula calculation related to an imaging parameter and an inspection parameter set in a worksheet are executed by a calculation unit 41a of the camera 2. Therefore, in the second image inspection system 1B, the calculation unit 41a of the camera 2 is a second control unit. The calculation unit 41a of the camera 2 is operated in a similar manner to the control unit 70 of the image processing controller 7 in the first image inspection system 1A.

Although an example in which the client device 8 including the first control unit is a device different from a controller or a smart camera including the second control unit is mainly described in the embodiment described above, the first control unit and the second control unit may be configured to be operated in a single integrated hardware (for example, a monitor integrated controller). Specifically, the inspection processing, the imaging processing, and the display processing may be shared and executed by different cores in the hardware or threads having different priorities. Based on a display request from a display device, the controller or the smart camera may be configured to execute a cell calculation for display using a core or a thread different from a core or a thread for executing the inspection processing and the imaging processing.

Effects of Embodiment

As described above, according to the present embodiment, when the image inspection systems 1A and 1B are set, since a formula setting of an imaging parameter, a formula setting of an inspection parameter, and a display setting of an inspection result can be set in cells of a worksheet, a user can easily grasp a relationship among the settings when the user sets a desired setting, as illustrated in FIGS. 5 and 8. When the image inspection systems 1A and 1B are operated, the control unit 80 of the client device 8 executes display processing of displaying the inspection result on the display unit 82. On the other hand, the imaging processing of the imaging unit 2A, the inspection processing on a workpiece image, and a formula calculation related to the imaging parameter and the inspection parameter are executed by a control unit (the control unit 70 of the image processing controller 7 in the first image inspection system 1A and the calculation unit 41a of the camera 2 in the second image inspection system 1B) different from the control unit 80 of the client device 8. Since control units are separated in this manner and the inspection processing and the display processing are executed by different control units, the inspection processing is not delayed due to execution of the display processing. Accordingly, the entire inspection can be speeded up.

The above-described embodiment is merely an example in all respects, and should not be construed in a limited manner. Further, modifications and changes belonging to an equivalent scope of claims are all within the scope of the present invention.

INDUSTRIAL APPLICABILITY

As described above, the image inspection system according to the present invention can be used when an inspection is performed based on a workpiece image obtained by imaging a workpiece.

What is claimed is:

1. An image inspection system that performs an inspection based on a workpiece image obtained by imaging a workpiece, the image inspection system comprising:
   an imaging unit configured to form a workpiece image by imaging a workpiece;
   a first control unit configured to generate a setting screen including a worksheet region in which a plurality of cells are arranged in a vertical direction and a horizontal direction, each of the plurality of cells being configured to receive as input at least one of a formula deriving a parameter and display setting, the parameter including an imaging parameter of the imaging unit and an inspection parameter; and
   a second control unit configured to cause the imaging unit to execute imaging processing based on the imaging parameter, the imaging parameter being derived from the formula input to one of the plurality of cells to which the imaging processing refers, and execute inspection processing on the workpiece image based on the inspection parameter to get an inspection result, the inspection parameter being derived from the formula input to one of the plurality of cells to which the inspection processing refers, wherein
   the first control unit displays the inspection result on a display unit according to the display setting in one of the plurality of cells, and
   the second control unit executes a formula calculation related to the imaging parameter and the inspection parameter set in the plurality of cells, the formula calculation including calculation of the formula input to one of the plurality of cells to which the imaging processing refers and the formula input to one of the plurality of cells to which the inspection processing refers.

2. The image inspection system according to claim 1, wherein
   the first control unit is operated in a client device, and
   the second control unit is operated in an image processing controller connected to the client device.

3. The image inspection system according to claim 1, wherein
   the second control unit analyzes the imaging processing, the inspection processing, and a reference relationship among the plurality of cells in the worksheet region, and automatically specifies the formula calculation to be executed by the second control unit based on an analysis result.

4. The image inspection system according to claim 1, wherein
   the imaging parameter, derived from the formula input to one of the plurality of cells, includes at least one of an exposure time of the imaging unit, a focus position of an optical system provided in the imaging unit, a zoom magnification of a zoom optical system provided in the imaging unit, and a gain of the imaging unit.

5. The image inspection system according to claim 1, wherein
the inspection parameter includes information, derivable from a formula input to one of the plurality of cells, for specifying a position on an image coordinate system to which an inspection tool is applied.

6. The image inspection system according to claim 5, wherein
the inspection parameter includes a search region and a search parameter of a positioning tool for searching a region to be inspected, the search region and the search parameter being derivable from a formula input to one of the plurality of cells.

7. The image inspection system according to claim 1, wherein
the inspection parameter includes information related to cooperation of a plurality of inspection tools, the information being derivable from a formula input to one of the plurality of cells.

8. The image inspection system according to claim 7, wherein
the inspection parameter includes an inspection parameter of a second inspection tool that executes processing based on an inspection result of a first inspection tool, the inspection parameter for the second inspection tool being derivable from a formula input to one of the plurality of cells to which the second inspection processing refers.

9. The image inspection system according to claim 1, wherein
the display setting, as input to one of the plurality of cells in the worksheet region, includes at least one of a display of a non-defective product and a defective product acquired by the inspection processing, a graph display of the number of non-defective products and the number of defective products acquired by the inspection processing, and a display of a workpiece image subjected to the inspection processing.

10. The image inspection system according to claim 1, wherein
the first control unit displays a graph using the inspection result on the display unit according to the display setting set in the one of the plurality of cells in the worksheet.

11. The image inspection system according to claim 1, wherein
the second control unit includes an imaging calculation unit and an inspection calculation unit, and
the second control unit is configured to cause the imaging calculation unit to execute a formula calculation of the imaging parameter and cause the inspection calculation unit to execute a formula calculation of the inspection parameter in parallel.

12. The image inspection system according to claim 1, wherein
the inspection processing involves a first inspection tool and a second inspection tool that executes processing after the first inspection tool,
after execution of processing by the first inspection tool is completed, the second control unit transmits a completion notification of the first inspection tool and a first inspection result of the first inspection tool to the first control unit, and starts a formula calculation of an inspection parameter of the second inspection tool,
the first control unit starts execution of display processing using the first inspection result according to the display setting, and
the display processing executed by the first control unit and the formula calculation executed by the second control unit are executed in parallel.

13. The image inspection system according to claim 1, wherein
after execution of the imaging processing and the inspection processing by the second control unit is completed, the first control unit executes all formula calculations set in the plurality of cells in the worksheet region, and generates a display screen on which execution results of the formula calculations are reflected.

* * * * *